Jan. 1, 1952
E. J. GREENAWALT
2,581,254
FIFTH WHEEL HANDLE
Filed Oct. 11, 1949
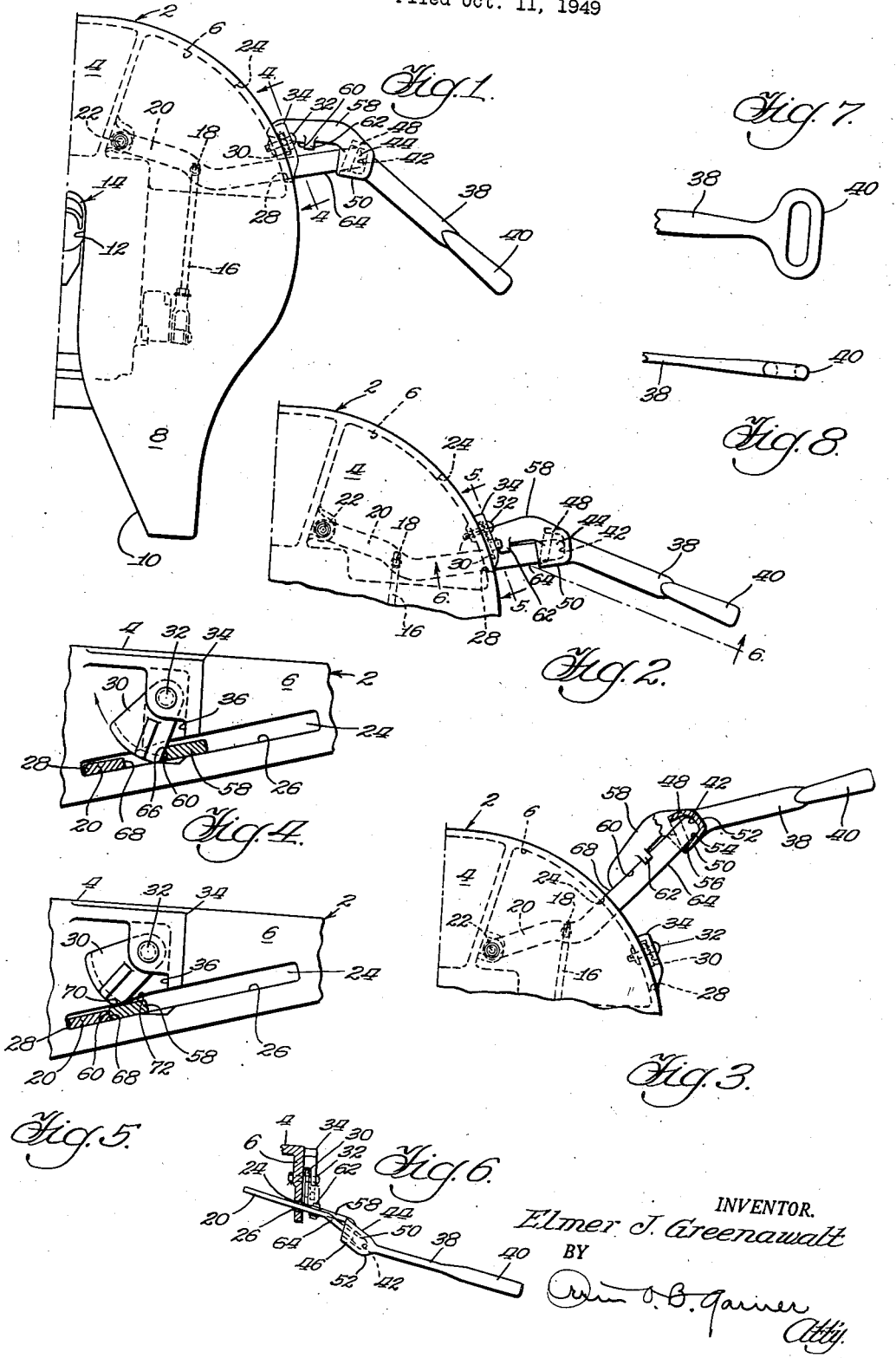
INVENTOR.
Elmer J. Greenawalt
BY
Atty.

Patented Jan. 1, 1952

2,581,254

UNITED STATES PATENT OFFICE 2,581,254

FIFTH WHEEL HANDLE

Elmer J. Greenawalt, Alliance, Ohio, assignor to American Steel Foundries, Chicago, Ill., a corporation of New Jersey Application October 11, 1949, Serial No. 120,759

11 Claims. (Cl. 280—33.05)

This invention relates to fifth wheels for tractor and trailer combinations and more particularly to a novel attachment for an operating lever of a fifth wheel coupler mechanism to facilitate unlocking the mechanism.

Standard coupling arrangements for tractor and trailer combinations embody a fifth wheel assembly mounted on a tractor and include a coupler mechanism and operating means therefor, the coupler mechanism being arranged to interlock with a king pin on the forward end of the trailer. In the coupled position of the tractor and trailer, the fifth wheel assembly is beneath the trailer and in order to unlock the tractor from the trailer the operator must stoop partly under the trailer, sometimes in an awkward position, and actuate the operating lever to unlock the coupler mechanism. The operator invariably is soiled from the road dirt or grease under the trailer or on the operating lever.

Frequently considerable force must be applied to the lever to unlock the coupler mechanism. Merely increasing the length of the lever would entail shipping difficulties and the possibility of its being damaged, and road dirt would still collect on the lever. Furthermore, the operator would still have to reach under the trailer to unlock the latch which locks the operating lever.

The general object of this invention is to provide a removable attachment for a conventional operating lever to increase operating leverage and which is effective to unlock the latch which locks the operating lever without the necessity of the operator reaching under the trailer.

A further object is to provide such an attachment which may be cheaply manufactured, of rugged simple construction, and easily applied and removed.

Another object is to provide such an attachment which will not interfere with the usual operation of the fifth wheel assembly.

A further object is to provide such an attachment which will afford increased leverage as is necessary to actuate the operating mechanism without distorting the parts.

A still further object is to provide an attachment which may be applied to fifth wheels presently in use.

These and other objects of the invention will become more apparent from the specification and the drawings, wherein:

Figure 1 is a top plan view of one half of a conventional fifth wheel with the invention applied thereto;

Figures 2 and 3 are views similar to Figure 1, Figure 2 showing the attachment rotated to unlock the latch, and Figure 3 showing the position of the parts with the coupler unlocked and a portion of the attachment in section;

Figure 4 is a fragmentary sectional view on the line 4—4 of Figure 1;

Figure 5 is a fragmentary sectional view on the line 5—5 of Figure 2;

Figure 6 is a sectional view on the line 6—6 of Figure 2; and

Figures 7 and 8 illustrate a modification of the handle of the attachment shown in Figures 1-6, Figure 7 being a top plan view thereof and Figure 8 being an edge view thereof.

Describing the invention in detail, the fifth wheel, generally designated 2, comprises a top plate 4 of conventional design including a peripheral depending flange 6. The plate 4 is bifurcated at its rear to provide a leg 8 at each side thereof between which is defined a slot 10 adapted to guide a king pin (not shown) on an associated trailer (not shown) into a communicating throat 12 in the plate for coupling in conventional manner with a coupler mechanism generally designated 14, as will be readily understood by those skilled in the art.

The coupler mechanism forms no part of the present invention and is shown and described in detail in United States Patent 2,015,313 for Tractor Trailer Coupling Device, issued to E. P. Kinne on May 14, 1932. The coupler mechanism is connected to operating means also described in said patent, said operating means including a rod 16 connected at one end to the coupler mechanism and extending toward the forward end of the wheel beneath plate 4. The other end of the rod is pivotally connected as at 18 to an operating lever 20 intermediate the ends thereof. The inner end of the lever is pivoted as at 22 to the plate and the outer extremity of the lever extends outwardly of one side of the plate through an elongated slot 24 in the flange 6. The lever is slidably supported adjacent its outer end on an edge 26 on the flange 6 at the bottom of the slot 24.

Rotation of the lever in a clockwise direction (Figures 1-3) is limited by a surface 28 on the flange 6 at the rear end of the slot 24. In the arrangement shown, the lever is adapted to be rotated in a counterclockwise direction (Figures 1-3) to pull the rod toward the forward end of the wheel and unlock the coupler mechanism as explained in the before-mentioned patent.

Referring now to Figure 1, the lever is shown in locked position. It is prevented from rotating in a clockwise direction through abutment with surface 28 and in a counterclockwise direction through abutment with a latch 30 which is pivotally mounted at its upper end on a pin 32, connected to the flange 6 and a bracket 34, the bracket being preferably formed integral with the flange 6. The latch in locking position extends across the slot 24 in the path of movement of the lever in a counterclockwise direction and is abuttable with a stop 36 on the bracket 34 to limit counterclockwise rotation (Figures 4 and 5) of the latch. It will be apparent from a consideration of Figures 4 and 5 that in order to rotate the lever from the position shown in Figure 1 to the position shown in Figure 3, the latch 30 must be rotated in a clockwise direction from across the slot to a position above and out of the path of movement of the lever.

The feature of the present invention is to provide an attachment or handle member for the operating lever and which may be applied in such manner to the lever as to unlock the latch and interlock with the lever, whereby the attachment, which increases the operating leverage, and the lever may be rotated in unison to unlock the coupler while the latch is maintained in unlocked position.

The attachment comprises an elongated member including a handle 38 provided with a handhold 40 at its outer end and with a socket 42 at its inner end. The socket is adapted to receive the outer end of the operating lever 20 and comprises spaced top and bottom walls 44 and 46, spaced side walls 48 and 50, and an inner wall 52. The walls 48, 50 and 52 extend between the top and bottom walls 44 and 46 and are connected thereto and the wall 52 extends between the walls 48 and 50 and is connected thereto. The external side of wall 52 is formed integral with the inner end of the handle 38. The inner side of wall 50 is provided with a substantially flat surface 54 adjacent its inner end and with an outwardly flaring cam surface 56 at its outer end, and the wall 48 diverges away from wall 50 outwardly of the socket.

The walls 44 and 48 are connected to a tongue member or latch releaser 58 which extends at one side of the socket forwardly thereof. The tongue member is provided with a generally flat surface 60 on its side adjacent the socket for engagement with the adjacent forward side 68 of the operating lever. The tongue member 58 is provided intermediate its ends with spaced top and bottom lugs 62, 62 projecting outwardly of surface 60 and adapted to engage the top and bottom sides of the lever 20 in order to maintain the tongue member 58 in alignment with the lever 20. The outer extremity of the tongue member in the locked position of lever 20 extends into the slot 24 and engages the latch 30 to unlock the same as hereinafter described.

In operation, the handle member is initially positioned on the lever as shown in Figure 1, whereat the handle member is angled rearwardly with respect to the lever 20 and the lever 20 extends into the socket 42 and bears or fulcrums on its rear side 64 against the cam or fulcrum surface 56. In this position, the tongue member 58, which extends generally longitudinally of the handle member, has its outer end positioned forwardly of the latch 30 within the slot 24 and in engagement with the latch as at 66, the latch having been partially rotated in a clockwise direction (Figure 4). The handle member is then rotated in a clockwise direction from the position shown in Figure 1 to the position shown in Figure 2, whereat the rear side 64 of the lever engages the surface 54 on wall 50 of the socket and the surface 60 of the tongue member 58 is caused to bear against the forward side 68 of the lever 20, the lever 20 being simultaneously received between the top and bottom lugs 62 of the tongue member 58. It will be noted that the tongue member, being rotated in a counterclockwise direction, rotates the latch 30 in a clockwise direction (Figure 5), whereby the tongue member raises the latch and slides thereunder and the latch member slidably engages as at 70 with the top side 72 of the tongue. With the latch 30 raised to unlocked position, the handle member and the lever 20 may both be rotated at point 22 in a counterclockwise direction from the position shown in Figure 2 to the position shown in Figure 3, whereat the coupler 14 is unlocked. It will be seen that the latch 30 is prevented from falling in front of the lever 20 as the handle and lever are rotated from the position shown in Figure 2 to the position shown in Figure 3 because of the engagement of the tongue 58 with the forward side 68 of the lever so that the lever will slide underneath the latch past the same. It will be noted that in the position of the handle member and the lever as shown in Figure 3, the latch 30 has rotated in a counterclockwise direction to locking position. As soon as the coupling mechanism is unlocked the handle is removed and may be stored in the tractor for future use inasmuch as the operating mechanism will be actuated automatically to position the handle in locked position behind the latch 30 by rotating the lever 20 in a clockwise direction from the position shown in Figure 3 to the position shown in Figure 1.

Figures 7 and 8 illustrate a modification wherein parts corresponding to those in Figures 1-6 are identified with corresponding numerals. In the present embodiment the handhold 40 is in the form of a loop substantially wider than the remainder of the handle member. This construction prevents the application of a pipe or the like to still further increase the leverage which would break the parts.

I claim:

1. In combination, a fifth wheel, a coupler and operating means therefor mounted on the wheel, said operating means including a lever pivoted at one end to the wheel and extending at the other end through a slot in said wheel, a latch pivoted to said wheel and rotatable across said slot to prevent rotation of the lever from a position whereat said coupler is locked to a position unlocking said coupler, and means adapted to be removably connected to said lever and release the latch comprising a member engageable with one side of the lever for rotation thereagainst and having a handle outwardly of the lever and a portion extending along the opposite side of the lever into said slot forwardly of the latch, said latch in the locking position thereof with the lever being rotatable in a direction toward the lever to unlocking position, said portion upon predetermined rotation of the lever being moved against said latch whereby the latch is caused to rotate to unlocking position with the portion sliding thereunder and engaging said opposite side of the lever, said portion having top and bottom lugs for embracing the lever therebetween, said member and lever being rotatable in unison when said portion is brought against said lever to unlock said coupler by sliding under the latch.

2. The combination of a fifth wheel comprising a coupler and actuating means therefor including a lever pivoted at one end, said lever being movable between locked and unlocking positions, latch means movable across the path of movement of said lever and formed and arranged to lock said lever in the locked position thereof, and operating means for said lever comprising a member rotatably attachable to the other end thereof and comprising a handle portion extending longitudinally of the lever, a loop-shaped handhold at the end of said member remote from said lever formed substantially wider than the remainder of said member, and means at the other end of said member formed and arranged to move under said latch means when said lever is in the locked position thereof upon rotation of said member in a predetermined manner and to interlock said member with said lever, said means affording a bearing area on the top thereof engaging said latch means for maintaining said latch means unlocked, said bearing area extending to the lever whereby said latch means are caused to slide against said area and then against the top of said lever when said member and lever are moved to the unlocking position of said lever.

3. In fifth wheel assembly, a wheel member including a top plate with a peripheral flange, a coupler associated with the plate, operating means for the coupler including a lever pivoted at one end to the plate and extending at the other end outwardly of the plate through a slot in said flange, said lever being positioned at one eind of the slot in the locked position of the coupler, a latch movably mounted on the flange adapted for abutment at one side with said lever to prevent its movement from said one end of the slot, and an extension for the lever having a socket intermediate its ends adapted to loosely receive said other end of the lever, a handle at one end of said extension, and a tongue at the other end of the extension adapted to project into said slot adjacent the opposite side of the latch, said extension being rotatable to unlock the latch and interlock with said lever in a direction causing said tongue to engage and unlock said latch, whereby said tongue is moved under the latch and engaged with said lever, thereby accommodating moving said extension and lever together in a direction unlocking said coupler.

4. The combination with a fifth wheel comprising a coupler and operating means therefor including a lever pivoted to the wheel and extending at one end outwardly thereof, a latch carried by the wheel and engageable with one side of said lever to prevent movement of the lever in a direction unlocking said mechanism, an extension for said lever having a fulcrum intermediate its ends adapted to engage the opposite side of the lever, a handle at one end of said extension, and a tongue at the other end of the extension adapted to engage said latch and move it to unlocking position and then engage said one side of said lever and interlock with the lever upon rotation of said extension on said fulcrum in a direction moving said tongue against said one side of the lever, whereupon said lever and extension are movable together in said one direction to unlock said coupler.

5. The combination of a fifth wheel comprising a coupler and actuating means therefor including a lever pivoted to said wheel and having an operating end, said lever being movable between locked and unlocking positions, latch means movable across the path of movement of said lever and formed and arranged to accommodate movement of the lever from unlocking to locked position and preventing movement of the lever from locked to unlocking position, and operating means for said lever comprising a member rotatably attachable to the operating end of said lever and means carried by said member arranged to move under and unlock said latching means when said lever is in locked position upon rotation of said member in a predetermined manner and to maintain said latch means unlocked whereby said member and lever may be moved to the unlocking position of said lever.

6. The combination with a fifth wheel comprising a coupler and operating means therefor including an operating member and a latch movable across the path of movement of said member to the unlocking position thereof to lock said member, of a handle element having a socket loosely receiving an end of said member whereby said element is rotatable with respect to said member, and means on said element engageable with said latch and adapted to move the latch to the unlocked position thereof when said element is rotated in one direction, said means being adapted to engage said member to limit said rotation of said element in said one direction and to lock said element and member together whereby both may be moved in unison to the unlocking position of said member.

7. A fifth wheel assembly comprising a coupler and operating means therefor including a lever, a latch releasably engageable with said lever to lock the lever in a predetermined position, and means for releasing said latch and rotating the lever to unlock said coupler comprising a member rotatably mounted on the lever and having a portion presenting a hanhold outwardly of said lever and having another portion formed and arranged to release said latch and interlock with the lever upon rotation of said member in a predetermined direction, whereupon said lever and member are movable together in a direction unlocking the coupler.

8. In an extension for an operating lever of a fifth wheel coupler mechanism, a member comprising means intermediate its ends for rotatably connecting the member with the lever, a handle at one end of said member including a handhold, and a combination latch releaser and abutment adapted to engage said lever to limit rotation of the extension in a predetermined direction.

9. An extension according to claim 8, wherein the combination latch releaser and abutment is provided with spaced means adapted to embrace the lever.

10. The combination of a fifth wheel having a coupler mechanism and operating means therefor including a lever, a latch adapted to releasably lock the lever in a predetermined position, a handle member formed and arranged to interlock with said lever, and means on said handle member adapted to engage and move said latch to the unlocked position thereof whereby said lever and handle are permitted to rotate together to unlock said coupler mechanism.

11. In an operating device for a fifth wheel coupler mechanism; the combination of a structure having a slot, a lever operatively connected to said mechanism and having a segment extending through said slot, a latch pivoted to said structure and engageable at one side thereof under the action of gravity with an edge of said segment to limit movement thereof in one direction within said slot, an actuator member pivoted to the lever and having a portion engageable with the other side of said latch for pivoting the latter out of engagement with said lever segment to accommodate engagement of said member portion with said lever segment and to accommodate movement of said portion and segment in said direction past said latch, said portion having an upper surface above that of the lever segment when engaged therewith.

ELMER J. GREENAWALT.

REFERENCES CITED

The following references are of record in the file of this patent:

UNITED STATES PATENTS

| Number | Name | Date |
|---|---|---|
| 2,073,566 | Scheubner | Mar. 9, 1937 |
| 2,096,282 | Korlering | Oct. 19, 1937 |
| 2,166,308 | Logan | July 18, 1939 |
| 2,440,152 | Norman et al. | Apr. 20, 1948 |